No. 726,740. PATENTED APR. 28, 1903.
T. F. O'NEIL.
NUT LOCK.
APPLICATION FILED JAN. 10, 1903.
NO MODEL.
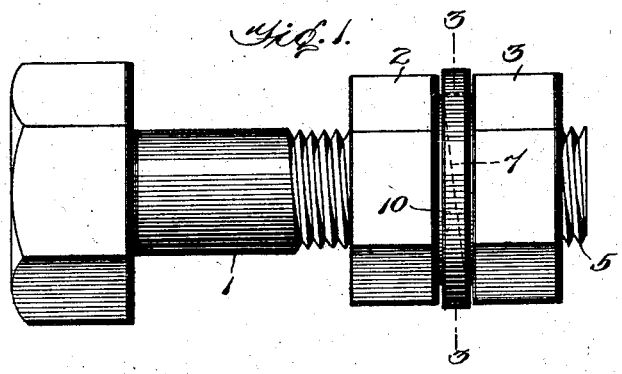
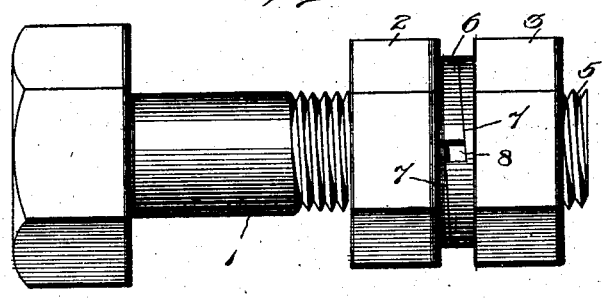
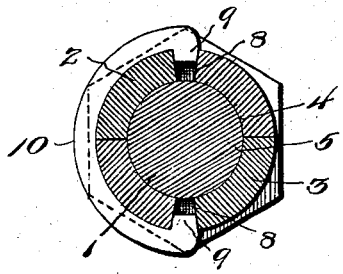
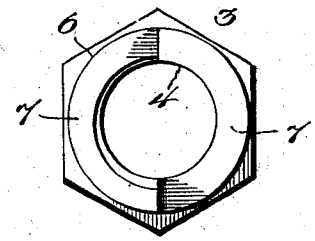
Witnesses
Inventor
Thomas F. O'Neil
by William A. Deane
his Attorney

UNITED STATES PATENT OFFICE.

THOMAS F. O'NEIL, OF GIRARD, OHIO.

NUT-LOCK.

SPECIFICATION forming part of Letters Patent No. 726,740, dated April 28, 1903.

Application filed January 10, 1903. Serial No. 138,555. (No model.)

*To all whom it may concern:*

Be it known that I, THOMAS F. O'NEIL, a citizen of the United States, residing at Girard, in the county of Trumbull and State of Ohio, have invented certain new and useful Improvements in Nut-Locks, of which the following is a specification.

This invention relates to an improvement in nut-locks, and has in view provision of a novel and effectual locking means for securely fastening a nut upon its bolt in engagement with the object against which it is screwed.

To this end the invention contemplates a type of nut-lock in which a pair of superposed nuts are employed upon a single-threaded bolt and have associated therewith means for effecting a locking action entirely through the wedging of the nuts upon the threads of the bolt, thus providing a thread-lock for the nuts.

The invention also has in view novel means for holding the nuts in wedged engagement upon the threads of the bolt and positively preventing rotation thereof in either direction.

With these and many other objects in view, which will more readily appear as the nature of the invention is better understood, the same consists in the novel construction, combination, and arrangement of parts, which will be hereinafter more fully described, illustrated, and claimed.

The essential features of the invention are necessarily susceptible to some modification without departing from the spirit or scope of the invention; but a preferred embodiment of the latter is shown in the accompanying drawings, in which—

Figure 1 is an elevation of a bolt having associated therewith a nut-lock constructed in accordance with this invention, the view illustrating the holding-key in position. Fig. 2 is a similar view showing the holding-key removed and exposing one of the key-sockets, which is temporarily provided for the reception of the engaging members of the holding-key. Fig. 3 is a sectional view on the line 3 3 of Fig. 1. Fig. 4 is an inner face view of one of the nuts.

Like reference-numerals designate corresponding parts throughout the several figures of the drawings.

In carrying out the invention it will of course be understood that the nut-lock is intended for general application to bolts used for any purpose—such as in connection with rail-joints, machinery, and the like. All uses of the invention embody the same construction, which involves the employment of a pair of lock-nuts 2 and 3, having threaded bolt-openings 4, engaging the single-threaded portion 5 of the bolt 1.

The nuts 2 and 3 are designed to be arranged in superposed relation, and each of the same is provided at one side thereof with a wedging clutch-face 6, preferably consisting of a plurality of ratchet-cam inclines 7, the said ratchet-cam inclines 7 of one nut being disposed reversely to those of the other nut, so that when one nut is turned in a direction to carry it away from the other the ratchet-cam inclines 7 of the two nuts will ride upon each other and necessarily exert a strong wedging action, which clamps or binds the nuts upon the thread of the bolt. When either of the nuts is thus turned to effect the locking action, there is provided at diametrically opposite sides of the nuts and between adjacent shoulders of the clutch-faces thereof the intervals 8, forming key-sockets for the reception of the chock-studs 9, projected inwardly from the extremities of a bowed or semicircular holding-key 10, preferably consisting of a finely-tempered steel spring, so the same may be sprung into the locking position (shown in Figs. 1 and 3) and also pried out of engagement with the nuts. The bowed or semicircular form of the key or spring 10 permits of the same to be placed astride one side of the match or clutch faces of the two nuts.

With the adjacent shoulders of the clutch-faces 6 engaging, whereby said clutch-faces are perfectly in match, the two nuts are carried on together until one nut is brought against the object. By then turning the other nut backward the wedging action referred to is secured and the sockets 8 opened up, so that the key or spring 10 may be sprung in place. To remove the nuts, the key or spring 10 is pried off, and both nuts are run off together from the bolt.

From the foregoing it is thought that the construction, operation, and many advantages of the herein-described nut-lock will be readily apparent without further description, and it will also be understood that changes in the form, proportion, and minor details of construction may be resorted to without departing from the spirit of the invention or sacrificing any of the advantages thereof.

Having thus described the invention, what is claimed, and desired to be secured by Letters Patent, is—

In a nut-lock, the combination with a single-threaded bolt, of a pair of superposed nuts provided upon adjacent sides with wedging clutch-faces consisting of ratchet-cam inclines, said nuts in the locked position being relatively turned in reverse directions to provide key-sockets between adjacent shoulders of their clutch-faces, and a bowed spring-holding key provided with terminal chock-studs adapted to be sprung into engagement with said key-sockets.

In testimony whereof I affix my signature in presence of two witnesses.

THOS. F. O'NEIL.

Witnesses:
FRANK R. COWDERY,
CATHERINE COWDERY.